(12) United States Patent
Chemin et al.

(10) Patent No.: US 7,944,168 B2
(45) Date of Patent: May 17, 2011

(54) DEVICE FOR CONTROLLING A ROTATING ELECTRICAL MACHINE

(75) Inventors: Michaël Chemin, Festigny (FR);
Frédéric Leroux, Créteil (FR); Gilbert Konan, Créteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 578 days.

(21) Appl. No.: 11/570,930

(22) PCT Filed: Jun. 30, 2005

(86) PCT No.: PCT/FR2005/001663
§ 371 (c)(1),
(2), (4) Date: Aug. 13, 2008

(87) PCT Pub. No.: WO2006/010864
PCT Pub. Date: Feb. 2, 2006

(65) Prior Publication Data
US 2008/0309266 A1    Dec. 18, 2008

(30) Foreign Application Priority Data
Jun. 30, 2004    (FR) .................................... 04 07262

(51) Int. Cl.
*H02P 6/00*    (2006.01)
(52) U.S. Cl. .............. 318/721; 318/400.02; 318/400.17; 318/716; 318/719

(58) Field of Classification Search ............. 318/400.02, 318/400.17, 721, 716, 719; 307/151; 363/1; 701/42
See application file for complete search history.

(56) References Cited

U.S. PATENT DOCUMENTS

| | | | |
|---|---|---|---|
| 6,069,467 A * | 5/2000 | Jansen ......................... | 318/802 |
| 6,297,574 B1 | 10/2001 | Schöb et al. | |
| 6,713,981 B2 | 3/2004 | Nakajima | |
| 7,180,263 B2 * | 2/2007 | Maeda et al. ................. | 318/719 |
| 2002/0011814 A1 | 1/2002 | Nakajimia | |
| 2002/0063491 A1 | 5/2002 | Kobayashi et al. | |
| 2002/0158523 A1 | 10/2002 | Abadia et al. | |

FOREIGN PATENT DOCUMENTS

| | | |
|---|---|---|
| DE | 10054530 | 2/2002 |
| EP | 1172925 | 1/2002 |
| EP | 1381148 | 1/2004 |
| WO | WO 0169762 | 9/2001 |

* cited by examiner

*Primary Examiner* — Rita Leykin
(74) *Attorney, Agent, or Firm* — Jacox, Meckstroth & Jenkins

(57) ABSTRACT

A device for determining the position of the rotor of a rotating electrical machine. The invention is characterized in that the device comprises a plurality of magnetic field sensors stationary relative to the stator and adapted to deliver multiphase electric signals representing a magnetic field detected by the sensors, and means for processing the multiphase electric signals by an operator capable of providing diphase signals depending on the position of the rotor. The invention is applicable to rotating electrical machines used in the automotive industry.

15 Claims, 4 Drawing Sheets

DEVICE FOR CONTROLLING A ROTATING ELECTRICAL MACHINE

BACKGROUND OF THE INVENTION

1. Field of the Invention

Figure 1:
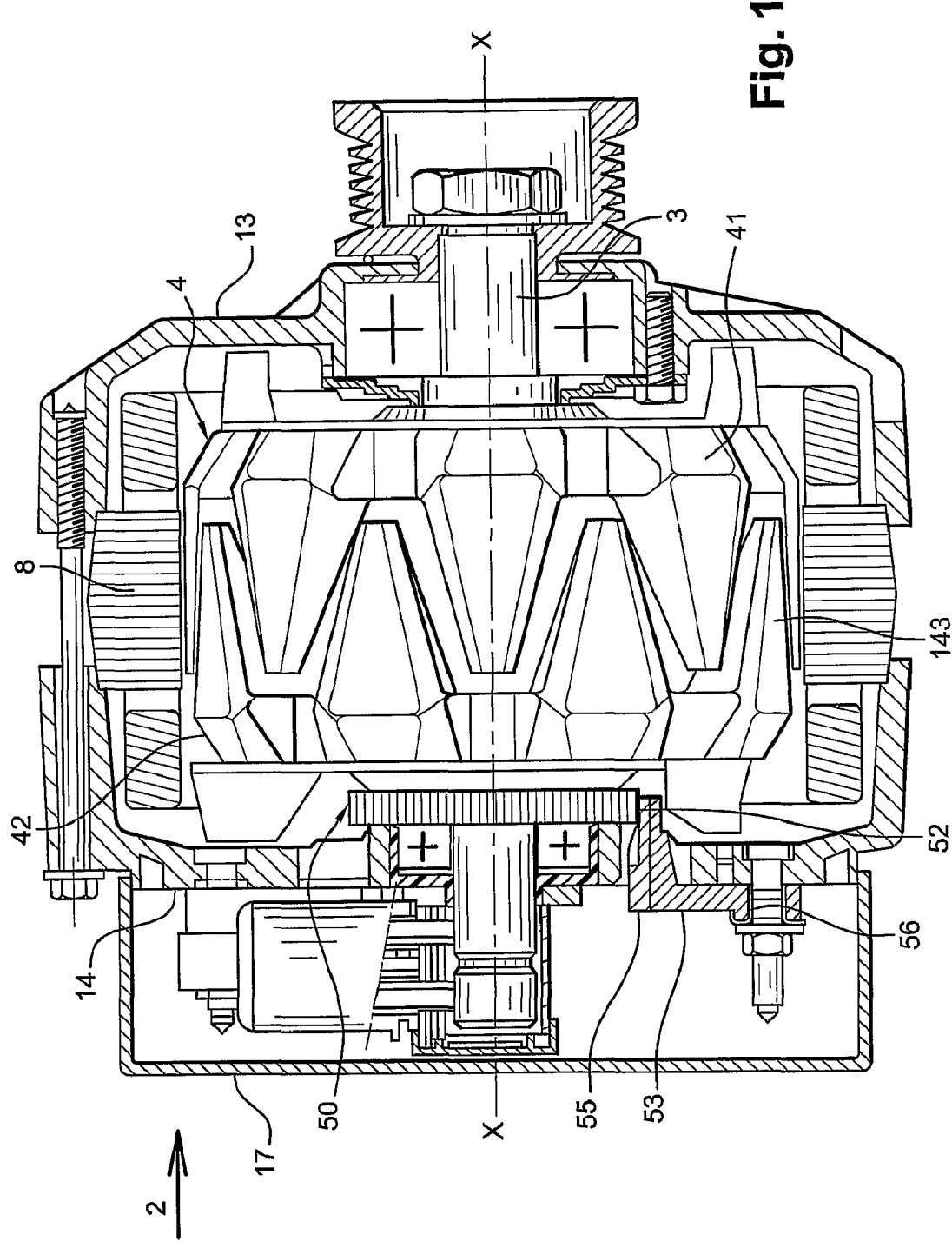

The present invention concerns a device for determining the position of a rotor of a rotary electrical machine comprising a stator.

The invention finds a particularly advantageous application in the field of reversible machines, or alternator/starters, used in the automotive industry, both in alternator mode and in motor mode on starting up or as an assistance to takeoff (boosting) as from 500 revolutions/minute.

2. Description of the Related Art

A reversible machine comprises an alternator including:

a rotor comprising a field winding associated conventionally with two collecting rings and two brushes by means of which an excitation current is brought;

a multiphase stator carrying several coils or windings that are connected in star or delta in the most frequent case of a three-phase structure and that deliver to a bridge rectifier, in alternator functioning, a converted electric power. The machine has two bearings, front and rear, for fixing it to the thermal engine and for fixing the stator. The stator surrounds the rotor. The rotor is carried by a shaft supported by the front and rear bearings. The brushes are connected to a regulator of the alternator in order to maintain the voltage of the alternator at the required voltage for a battery depending on whether it is offload or under charge.

The alternator converts a rotation movement of the rotor driven by the thermal engine of the vehicle into an electric current induced in the stator windings.

The alternator may also be reversible and compose an electric motor, or rotary electrical machine, making it possible to drive in rotation, via the rotary shaft, the thermal engine of the vehicle. This reversible alternator is called an alternator/starter. It converts mechanical energy into electrical energy and vice versa.

Thus, in alternator mode, the alternator/starter charges in particular the vehicle battery and consumers whilst in starter mode the alternator/starter drives the thermal engine, also referred to as the internal combustion engine, of the motor vehicle in order to start it.

In reversible machines in the automotive industry, for example, functioning according to motor or starter modes, the stator must be controlled for current so as to at all times apply to the rotor the torque necessary both for starting it up and to impart to it the required rotation for the functioning of the motor. However, this torque to be applied to the rotor, and therefore the current to be supplied to the phases of the stator, is a sinusoidal function of the position, referenced by the angle $\theta$, of the rotor with respect to the stator, and hence the need to determine this position precisely.

To this end, certain reversible electrical machines, in particular those used in the automotive industry, are currently equipped with a device known by the term resolver disposed at the end of the shaft of the rotor of the machine. Such a resolver is described in U.S. Patent Publication No. 2002/0063491 A1. It has itself a stator and a rotor that are respectively fixed with respect to the stator and rotor of the machine. The resolver measurers the magnetic field issuing from its own rotor. This magnetic field, being fixed with respect to the rotor, which is itself fixed with respect to the rotor of the machine, represents the position of the actual rotor of the machine.

However, this type of equipment has a certain number of drawbacks. Resolvers are in fact expensive and their implementation to make them operational is complex because of the coupling to be effected between such a resolver and the machine itself requiring the presence of electronic computing components to supply a correct position of the rotor of the machine from the coupling parameters.

In addition, they are sensitive to the magnetic disturbance caused by the stray magnetic field produced by the rotor, which causes a malfunctioning of the system and therefore measurement errors and poor control of the machine. To limit this drawback, it is necessary to have recourse to magnetic protection, such as a stainless-steel tube placed between the rotor and the resolver at the shaft end. In addition, the mechanical strength of this device is not perfect since it is particularly sensitive to the vibration of the machine because of the mounting on the end of the rotor shaft.

Finally, their resistance to salt spray and dust is not completely satisfactory.

SUMMARY OF THE INVENTION

Thus the technical problem to be resolved by the object of the present invention is to propose a device for determining the position of the rotor of a rotary electrical machine comprising a stator, which would make it possible to obtain the precise position sought whilst being inexpensive, simple to implement and insensitive to magnetic disturbance.

The solution to the technical problem posed consists, according to the present invention, of a device comprising a plurality of magnetic field sensors fixed with respect to the stator and able to deliver first signals representing a rotating magnetic field detected by the sensors, and means of processing the first signals by an operator able to supply second signals depending on the position.

According to a first embodiment, the first signals are three-phase electrical signals and the second signals are two-phase electrical signals.

According to the invention, the operator is represented by a matrix for projecting a multiphase reference frame in a two-phase reference frame. According to a first embodiment, the projection matrix is a Concordia matrix. According to a second embodiment, the projection matrix is Clark's matrix.

Thus will be seen in detail below, the device according to the invention leads to a precise determination of the position of the rotor because in particular of its independence vis-à-vis many parameters and its insensitivity to various disturbances and stray phenomena.

Moreover, several characteristics of the determination device that is the object of the invention contribute to reducing its cost and simplifying its implementation.

In particular, the invention makes provision for the sensors to be Hall effect sensors. The advantage of this type of sensor is that they are inexpensive and simple to use. According to a first embodiment, the plurality of sensors is composed of three sensors electrically out of phase by 120°.

According to a second embodiment the plurality of sensors is composed of two sensors electrically out of phase by 90°.

The rotary magnetic field necessary for the functioning of the device according to the invention can be obtained according to two different production methods.

In a first production method the magnetic field is the magnetic field created by the rotor, while in a second production method the magnetic field is created by a magnetized target connected to the rotor shaft.

Other objects and advantages of the invention will be apparent from the following description, the accompanying drawings and the appended claims.

It is found that, in each case, the device according to the invention does not involve any expensive equipment since in the first case the magnetic field is directly supplied by the rotor itself and in the second case the magnetic field is supplied by a target, since a direct calculation is made of the position of the rotor with respect to a magnetic field of the rotor or of the target, the latter being less expensive than a resolver.

BRIEF DESCRIPTION OF THE ACCOMPANYING DRAWINGS

The description that follows with regard to the accompanying drawings, given by way of non-limiting examples, will give a clear understanding of what the invention consists and how it can be implemented.

Figure 2:
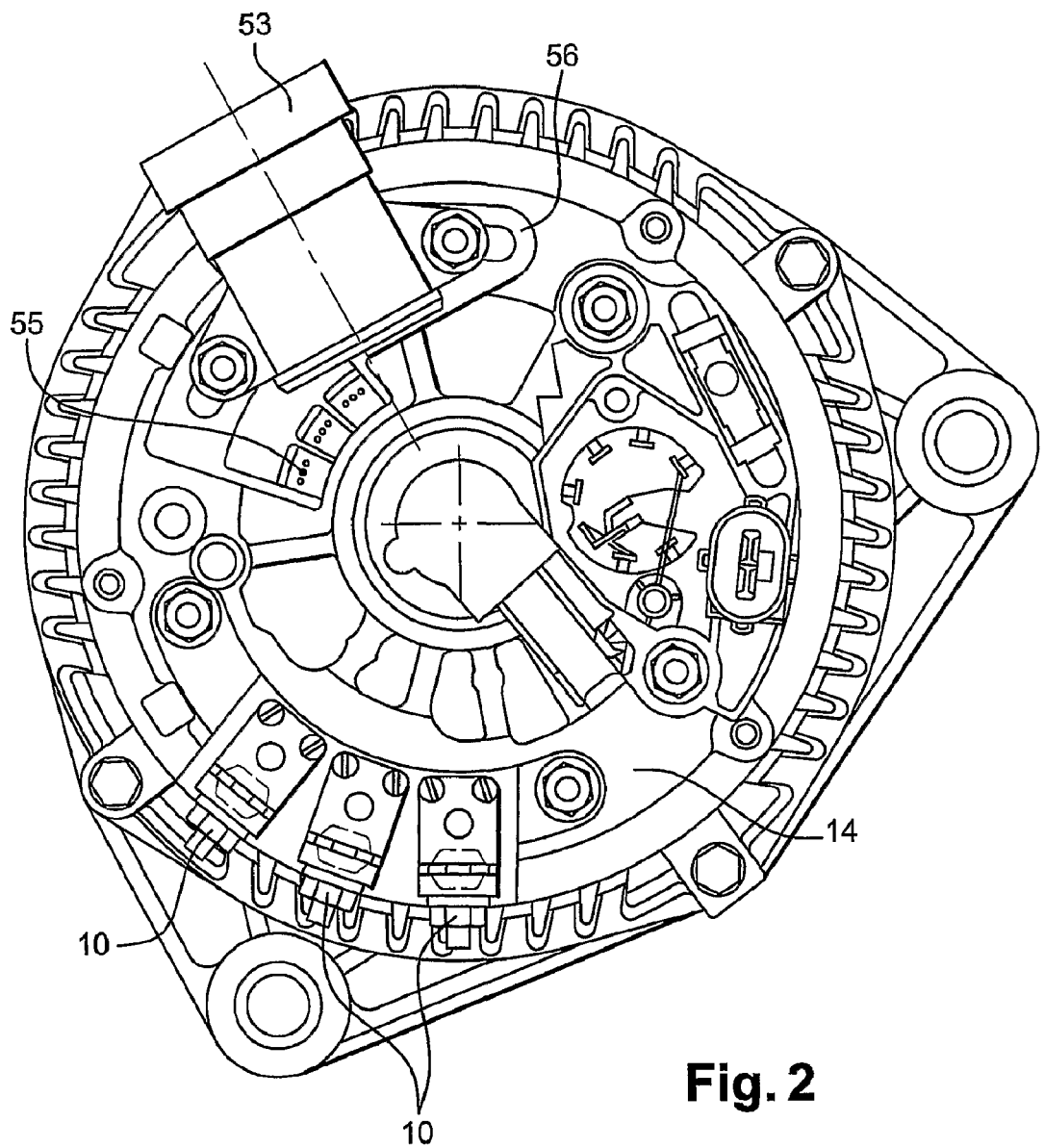
Figure 3:
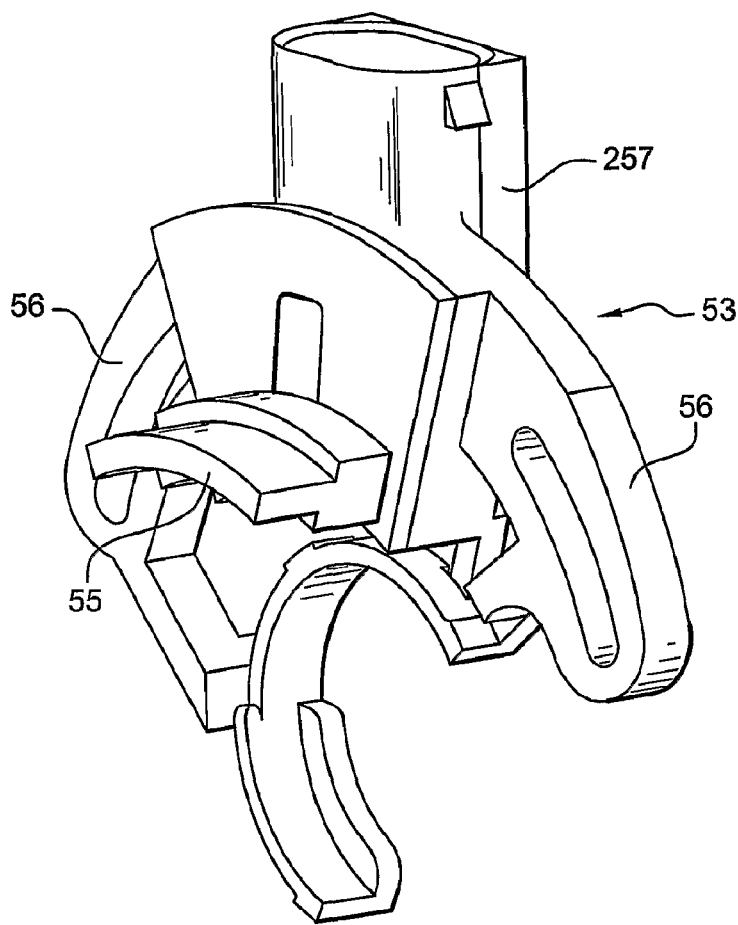
Figure 4:
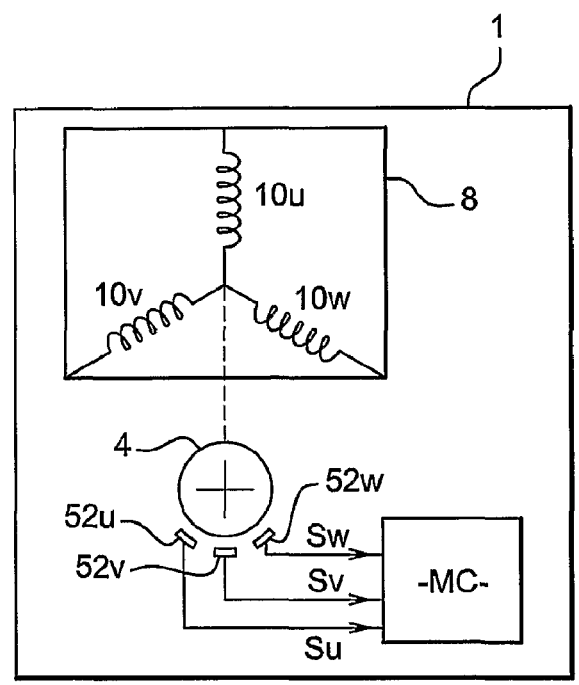
Figure 5:
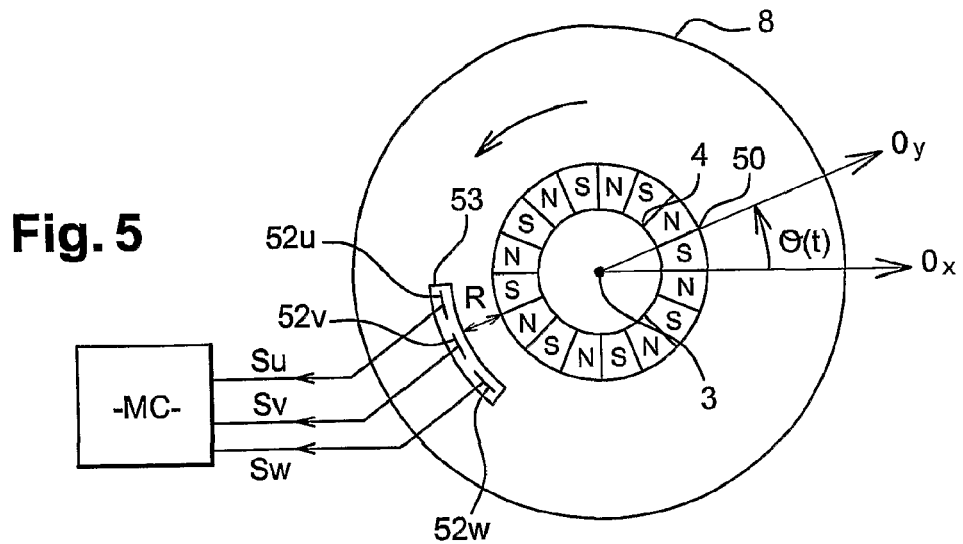
Figure 6:
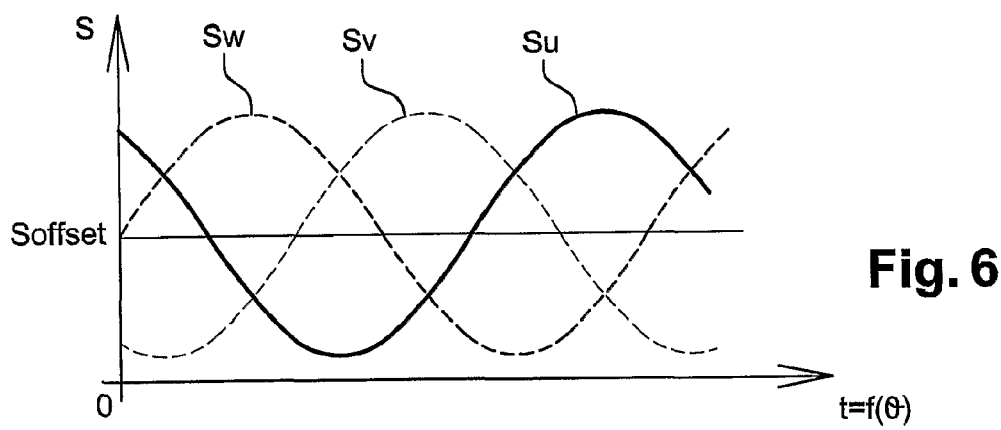
Figure 7:
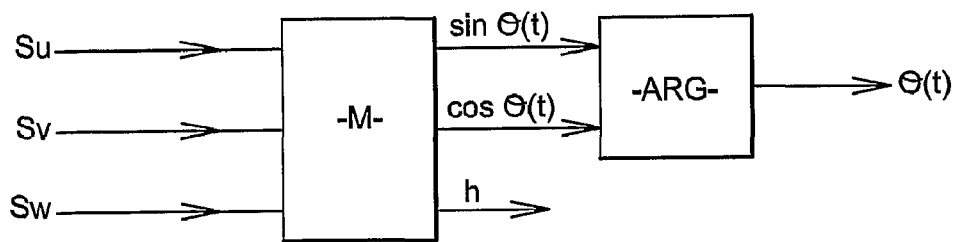

FIG. 1 is a view in axial section of a rotary electrical machine comprising a position determination device according to the invention, FIG. 2 is a view in the direction of the arrow 2 of the rotary electrical machine in FIG. 1, FIG. 3 is a perspective view of a sensor holder of the determination device of the invention in FIG. 1, FIG. 4 is a schematic representation of a rotary electrical machine of FIG. 1 comprising an embodiment of a position determination device according to the invention, FIG. 5 is a diagram of the method of producing the position determination device of FIG. 4, FIG. 6 is a diagram showing the variations in the sensor output signals of the device of FIG. 4, and FIG. 7 is a diagram of a sequence for the processing of the signals by the position determination device of FIG. 4.

DETAILED DESCRIPTION OF THE PREFERRED EMBODIMENTS

In the description that follows, the example is taken of a claw-type rotary electrical machine.

FIG. 1 depicts such a rotary electrical machine comprising, in a first embodiment:

a wound stator 8 provided here with three windings for defining three phases 10 (depicted FIG. 2), the stator also comprising poles, a rotor 4 comprising two magnet wheels with claws 41, 42 fixed to a shaft 3, the claws also being referred to as teeth 143. The teeth of one of the magnet wheels are interlocked with one another. When the rotor is supplied with current, the teeth on one of the magnet wheels define North poles, whilst the teeth on the other magnet wheel define South poles. The rotor is thus magnetized. There is then a creation of pairs of North-South poles, a front 13 and rear 14 bearing to which a protective cover 17 is fixed, the bearings allowing rotary mounting of the respective front and rear ends of the shaft 3 of the rotor, a device for determining the position θ(t) of the rotor 4, and an axial or radial reading target 50 rotationally fixed to the rotor, or particularly connected to the shaft 3 of the rotor. Advantageously the target 50 is magnetic and comprises an alteration of South poles and North poles distributed regularly, defined by permanent magnets for example. Preferentially the target 50 comprises a number of pairs of magnet poles identical to that of the rotor 4.

In a second non-limiting embodiment, the rotary electrical machine is equivalent to that described in FIG. 1 but does not comprise a target 50.

A rotor comprising eight pairs of poles will be taken as an example.

The device for determining the position θ(t) of the rotor 4 comprises:

magnetic field sensors 52, the sensors being three in number in the case of a three-phase machine in the example taken, a sensor holder 53 intended to carry the three sensors 52, the sensor holder being fixed to the bottom of the rear bearing 14, means MC of processing first signals issuing from the sensors 52 by an operator [M].

According to the first embodiment, the magnetic field sensors 52 are located facing the target 50, and the sensor holder 53 is fixed to the face of the rear bearing 14 turned in the opposite direction to the target 50, as illustrated in FIG. 2, FIG. 2 being a view in the direction of the arrow 2 in FIG. 1 without the cover 17.

In a first variant embodiment, the sensors 52 are located radially opposite the target 50, perpendicular with respect to the shaft 3 of the rotor 4, with the definition of an air gap between the sensors and the target so that the reading is radial, as illustrated in FIG. 1.

A second variant embodiment, the sensors 52 are located axially opposite the target 50, in the axis of the shaft 3 of the rotor 4, with the definition of an air gap between the sensors and the target so that the reading is axial.

According to the second embodiment, the magnet field sensors 52 are located facing the rotor 4 and the sensor holder 53 is fixed to the face of the front bearing 13.

In a first variant embodiment, the sensors 52 are located radially on the side of the rotor 50, perpendicular with respect to the shaft 3 of the rotor 4 so that the reading is radial.

In a second variant embodiment, the sensors 52 are located axially on the top of the rotor 4, in the axis of the shaft 3 of the rotor 4, so that the reading is axial.

Preferentially, the sensors are molded onto the sensor holder 53, the latter preferably being made from plastics material. This enables the assembly consisting of sensor and sensor holder to be impervious and thus to be less sensitive to salt spray and dust.

FIG. 3 shows an example of an embodiment of a sensor holder 53 for radial reading. The sensor holder 53 comprises in particular:

a connector 257 in which metal tracks make a connection between the connector and the sensors 52, the connector 257 forming a connection with the electronic part of the machine, a sector 55 for accepting the sensors 52, the sensors 52 being situated at the internal periphery of the sector in the example taken of radial reading, and lugs for fixing the sensor holder 53 to the rear bearing 14 in the example taken.

It should be noted that, for more information on the sensor holder 53, reference should be made to the description of WO 01/69762 A1, also published as U.S. 2002/0158523, in particular pages 21 and 22, which is incorporated herein by reference and made a part hereof.

FIG. 4 is a schematic representation of elements of the rotary electrical machine 1 comprising an embodiment of the rotor position determination device according to the invention.

It is thus possible to see the three phases $10u$, $10v$ and $10w$ of the stator 8, the rotor 4 and the three sensors $52u$, $52v$, $52w$, the latter being connected to means MC of processing the first signals issuing from the sensors.

FIG. 5 is another schematic representation of the device for determining the position θ(t) of the rotor 4. More precisely, the expression position of the rotor means the position of a direction Oy relating to the rotation movement of the rotor taken with respect to a fixed direction Ox relating to the sensor holder 53 and therefore fixed with respect to the stator 8.

Advantageously, the set of sensors is composed of three Hall effect sensors 52u, 52v, 52w out of phase with one another by 120° electrical. Another arrangement of sensors can however be provided. For example, Hall effect sensors out of phase with each other by 90° electrical or more than three sensors, for example five sensors out of phase with one another by 72° electrical. The advantage of Hall effect sensors is to measure a magnetic field and to transpose this measurement into a signal representing the magnetic field with a quantity equivalent to a voltage, frequency, current, numerical, etc.

The sensors 52u, 52v, 52w are intended to supply first signals $s_u$, $s_v$ and $s_w$ representing a magnetic field detected at each sensor and created by the movement of the rotor in the stator. The three sensors measure the magnetic field at the same time at different points. This magnetic field is a sum of the various magnetic fields issuing from various sources.

Thus, in the first embodiment, the case of the target 50, the magnetic field is created by the target 50 with in addition, where applicable, a stray field created by the magnet wheels 41, 42 of the rotor 4 itself.

In the second embodiment, the case of the rotor 4 without a target, the magnet field is created by the rotor 4 itself.

Preferentially, the first signals are three-phase electrical signals. The first signals can also be numerical signals representing the magnetic field.

FIG. 6 illustrates the variations over time in the first signals $s_u$, $s_v$, and $s_w$ delivered by the three sensors 52u, 52v and 52w in the case of three-phase electrical signals. These first ones have a continuous offset component $s_{offset}$ including where applicable the magnetic disturbances created by the rotor 4, and a substantially sinusoidal component reproducing the variations in the magnetic field detected by each sensor.

It should be noted that the continuous offset component $s_{offset}$ therefore depends in particular on:
- the current supplying the rotor and therefore on the way the rotor is magnetized, and
- the impreciseness of the measurements caused by the sensors themselves.

Such an offset may have the value 2.5 V.

Moreover, the sinusoidal component depends in particular on the position of the sensor with respect to the rotor 4 (the case of the second embodiment) or to the target 50 (the case of the first embodiment), this position being determined by the distance are illustrated in FIG. 5. More precisely, the component varies as a function of $1/R^2$.

Thus, the closer a sensor 52 is to the rotor 4 (the case of the second embodiment) or to the target 50 (the case of the first embodiment), the greater are the variations in amplitude of the sinusoidal component.

By way of example, the maximum of the signals is reached when the sensor is situated opposite a North pole of the rotor 4 (the case of the second embodiment) or the target 50 (the case of the first embodiment). The signals are on the other hand at a minimum whenever a sensor is situated opposite a South pole of the rotor 4 (the case of the second embodiment) or of the target 50 (the case of the first embodiment).

Finally, all the signals $s_u$, $s_v$ and $s_w$ depend directly on the position θ(t) of the rotor sought since the frequency of the signals depends on the rotation frequency of the rotor 4 (the case of the second embodiment) and on its number of poles or on the number of poles on the target 50 (the case of the first embodiment). Thus the frequency of the first signals issuing from the sensors 52 is equal to that of the rotation of the rotor 4 multiplied by the number of pairs of poles of the rotor 4 (the case of the second embodiment) or of the target 50 (the case of the first embodiment).

FIG. 7 gives a diagram of a processing sequence making it possible to precisely extract the position θ(t) of the signals $s_u$, $s_v$ and $s_w$. It should be noted that the whole of the processing sequence described below is affected by the signal processing means MC, which are preferentially a microcontroller situated in the electronic part that controls the machine, an electronic part that is in a known manner situated in an external housing or integrated in the machine.

In a first step, there is applied to the first signal $s_u$, $s_v$ and $s_w$ issuing from the sensors 52 an operator represented by a projection matrix M able to supply second signals sin θ(t) and cos θ(t) dependent on the position θ(t) of the rotor 4.

In a first non-limiting embodiment, the matrix M is a matrix of projection of a multiphase reference frame to a two-phase reference frame, thus converting multiphase signals into two-phase signals. In our case, the multiphase reference frame is a three-phase reference frame.

Thus:

$$\begin{vmatrix} \sin\theta(t) \\ \cos\theta(t) \\ h \end{vmatrix} = [M] \begin{vmatrix} S_u \\ S_v \\ S_w \end{vmatrix}$$

The third output component h, referred to as the homopolar component, is not used in the context of the invention. It is composed of an average of the offset components $s_{offset}$ and a signal whose amplitude is a function of a phase-shift error between the signals supplied by the Hall effect sensors in the case where the sensors are not properly mounted so that the first signals are not exactly out of phase by 120° for example.

According to a first variant of this first embodiment, the projection matrix M is a matrix that is the inverse of a matrix known by the name Concordia matrix C.

The matrix $$[C] = \sqrt{(2/3)} \begin{vmatrix} 1 & 0 & 1/\sqrt{2} \\ -1/2 & (\sqrt{3})/2 & 1/\sqrt{2} \\ -1/2 & (\sqrt{3})/2 & 1/\sqrt{2} \end{vmatrix}$$

is an example of an applicable Concordia matrix, that is to say $$[C]^{-1} = \sqrt{(2/3)} \begin{vmatrix} 1 & -1/2 & -1/2 \\ 0 & \sqrt{3}/2 & -\sqrt{3}/2 \\ 1/\sqrt{2} & 1/\sqrt{2} & 1/\sqrt{2} \end{vmatrix}$$

According to a second variant of this first embodiment, the projection matrix M is a matrix that is the inverse of a matrix known by the name Clark's matrix C.

The matrix $$[C] = \begin{vmatrix} 1 & 0 & 1 \\ -1/2 & -(\sqrt{3})/2 & 1 \\ -1/2 & (\sqrt{3})/2 & 1 \end{vmatrix}$$

is an example of a Clark's matrix applicable, that is to say $$[C]^{-1} = 2/3 \begin{vmatrix} 1 & -1/2 & -1/2 \\ 0 & -(\sqrt{3})/2 & (\sqrt{3})/2 \\ 1/2 & 1/2 & 1/2 \end{vmatrix}$$

It should be noted that the coefficients of these projection matrices are constant but are a function of conventions such as the direction of rotation taken of the three-phase currents, the intensity of its currents etc. Thus it is possible to have a different standardization factor.

In a second step, the argument of an angle $\theta(t)$ is calculated from the second two signals $\sin\theta(t)$ and $\cos\theta(t)$, the angle $\theta(t)$ representing the position of the rotor 4.

Thus this calculation makes it possible to determine the position $\theta(t)$ of the rotor 4 unequivocally to within 360° electrical, that is to say 360°/8 equals 45° mechanical for eight pairs of poles of the rotor 4 in the example taken. It will be recalled that a number of electrical turns is equal to the number of pairs of poles times the number of mechanical turns, one mechanical turn corresponding to 360° physical of the rotor.

It should be noted that use is preferentially made of the argument instead of the tangent arc, which makes it possible to be dissociated from the amplitude of the first signals $s_u$, $s_v$, and $s_w$, the argument being the same whatever the amplitude of the signals.

In addition, as described previously, this makes it possible to have the position of the rotor over 360° instead of 180° in the case of the tangent arc.

It should be noted that the processing that has just been described is carried out by the microcontroller MC whenever the position of the rotor 4 is necessary for controlling the machine.

Thus, even before starting up, it is possible to have the position $\theta(t)$ of the rotor 4, the Hall effect sensors continuously detecting the magnetic field.

Thus one of the advantages of the processing illustrated in FIG. 7 is that it is independent of parameters such as the amplitude of the first signals $s_u$, $s_v$ and $s_w$ or such as the offsets $s_{offset}$, which makes the result of the determination of the position $\theta(t)$ insensitive to magnetic disturbances, in accordance with an aim of the invention.

It should also be noted that the device according to the invention that has just been described with regard to FIGS. 1 to 7 is also insensitive to the common mode interference that could be applied to the first output signals, $s_u$, $s_v$ and $s_w$ of the magnetic field sensors 52u, 52v and 52w. It should be stated that common mode interference is due to differences in references between a first signal measured by a sensor and referenced with respect to the earth of the sensor and the first signal received by the microcontroller MC and referenced with respect to the earth of the microcontroller MC. It may happen that the two references are offset with respect to each other, this offset introducing an error called common mode interference. By dispensing with the offset $s_{offset}$ due to a sensor (that is to say the 2.5 V referenced with respect to the earth of the sensor), this common mode interference is also dispensed with Finally, it should be noted that the device for determining the position according to the invention can also be implemented in all the electrical machines where the position of the rotor with respect to the stator must be known with precision. The invention is thus applicable to any type of electrical machine and for different functionings. The invention can in fact apply to machines functioning as an alternator alone, as a motor alone or as an alternator/starter, and of the asynchronous machine type, synchronous machines with claws and with or without inter-pole magnets, or machines with rotor with permanent magnets.

While the process and product herein described constitute preferred embodiments of this invention, it is to be understood that the invention is not limited to this precise process and product, and that changes may be made therein without departing from the scope of the invention which is defined in the appended claims.

What is claimed is:

1. A device for determining the position ($\theta(t)$) of a rotor of a rotary electrical machine comprising a stator, wherein said device comprises:
   a plurality of magnetic field sensors fixed with respect to said stator and able to deliver first signals representing a rotating magnetic field detected by said plurality of magnetic field sensors; and
   means of processing said first signals by an operator able to supply second signals ($\sin\theta(t)$, $\cos\theta(t)$) dependent on said position ($\theta(t)$);
   Wherein said rotary magnetic field is directly limited to a revolution of said rotor;
   wherein said operator is represented by a projection matrix for projecting a multiphase reference frame in a two-phase reference frame.

2. The device according to claim 1, wherein said projection matrix is an inverse Concorida matrix ($[C]^{-1}$).

3. The device according to claim 1, wherein said projection matrix is an inverse Clark's matrix ($[C]^{-1}$).

4. The device according to claim 1, wherein said plurality of sensors is composed of three sensors out of phase electrically by 120°.

5. The device according to claim 1, wherein said plurality of sensors is composed of two sensors out of phase electrically by 90°.

6. The device according to claim 1, wherein said sensors are Hall effect sensors.

7. A rotary electrical machine comprising a rotor and a stator, characterized in that it comprises a device for determining the position of the rotor according to claim 1.

8. The device according to claim 1, wherein said second signals are two-phase electrical signals.

9. A method for controlling torque of a rotor in an electric motor having the rotor and a stator; said method comprising the steps of:
   sensing a movement of the rotor with a plurality of magnetic field sensors and generating a plurality of first signals, respectively, in response thereto;
   processing said plurality of first signals using an operator and generating a plurality of second signals, respectively, in response thereto; and
   using said plurality of second signals to adjust a current to be supplied to at least one phase of at least one winding in the electric motor;

wherein said rotary magnetic field is directly limited to a revolution of said rotor;

wherein said operator is represented by a projection matrix for projecting a multiphase reference frame in a two-phase reference frame.

10. The method as recited in claim 9, wherein said sensing step comprises the step of:

using a plurality of Hall effect sensors to perform said sensing step.

11. The method as recited in claim 9, wherein said sensing step comprises the step of:

generating a plurality of signals that are three-phase electrical signals.

12. The method as recited in claim 9, wherein said sensing step comprises the step of:

generating a plurality of signals that are two-phase electrical signals.

13. The method as recited in claim 9, wherein said sensing step comprises the step of:

situating a magnetized target on a shaft of said rotor, said magnetized target cooperating with said plurality of sensors to generate said plurality of first signals.

14. The method according to claim 9, wherein said projection matrix is an inverse Concorida matrix ($[C]^{-1}$).

15. The method according to claim 9, wherein said projection matrix is an inverse Clark's matrix ($[C]^{-1}$).

* * * * *